(12) United States Patent
Li (10) Patent No.: US 8,408,772 B2
(45) Date of Patent: Apr. 2, 2013

(54) LED ILLUMINATION DEVICE

(75) Inventor: Wei Li, South Barrington, IL (US)

(73) Assignee: Excelitas Technologies LED Solutions, Inc., Wheeling, IL (US)

( * ) Notice: Subject to any disclaimer, the term of this patent is extended or adjusted under 35 U.S.C. 154(b) by 358 days.

(21) Appl. No.: 12/705,411

(22) Filed: Feb. 12, 2010

(65) Prior Publication Data

US 2010/0208487 A1 Aug. 19, 2010

Related U.S. Application Data

(60) Provisional application No. 61/152,298, filed on Feb. 13, 2009.

(51) Int. Cl.
*G02B 6/04* (2006.01)
*F21V 1/00* (2006.01)
*H01L 33/00* (2010.01)

(52) U.S. Cl. ........ 362/554; 362/237; 362/244; 362/268; 362/551; 362/555

(58) Field of Classification Search .................. 362/551, 362/554, 555, 268, 237, 244
See application file for complete search history.

(56) References Cited

U.S. PATENT DOCUMENTS

| | | | |
|---|---|---|---|
| 5,548,676 A | 8/1996 | Savage, Jr. | |
| 5,634,711 A | 6/1997 | Kennedy et al. | |
| 5,751,869 A * | 5/1998 | Li et al. | 385/33 |
| 5,815,624 A | 9/1998 | Rosenberg | |
| 5,997,150 A | 12/1999 | Anderson | |
| 6,253,006 B1 | 6/2001 | Heimer | |
| 6,272,269 B1 | 8/2001 | Naum | |
| 6,290,382 B1 * | 9/2001 | Bourn et al. | 362/554 |
| 6,328,484 B1 | 12/2001 | Uebbing | |
| 6,402,347 B1 | 6/2002 | Maas et al. | |
| 6,443,594 B1 | 9/2002 | Marshall et al. | |

(Continued)

FOREIGN PATENT DOCUMENTS

| | | |
|---|---|---|
| DE | 102004051382 A1 | 4/2006 |
| DE | 10-2005-017238 A1 | 10/2006 |

(Continued)

OTHER PUBLICATIONS

International Preliminary report on Patentability received for PCT Patent Application No. PCT/US2010/024141, mailed on Aug. 25, 2011, 7 pages.

(Continued)

*Primary Examiner* — Stephen F Husar
*Assistant Examiner* — James Cranson, Jr.
(74) *Attorney, Agent, or Firm* — Peter A. Nieves; Sheehan Phinney Bass + Green PA (57) ABSTRACT

A device comprising a plurality of LEDs arranged in a coplanar array, the coplanar array comprising an LED at the center and LEDs positioned radially symmetrically around the LED at the center, and wherein the central axes of the LEDs are arranged to be parallel to each other; a one-piece lens array collimating light from the LEDs, the lens array comprising a plurality of coplanar lens tiles, the coplanar lens tiles comprising a lens tile at the center and lens tiles positioned radially symmetrically around the lens tile at the center, and wherein the central axis of each of the lens tiles is aligned with the central axis of a corresponding LED; and a focusing lens converging the collimated light from the lens array into a single image in a focal plane, wherein the central axis of the focusing lens is aligned with the central axis of the lens array.

29 Claims, 10 Drawing Sheets

U.S. PATENT DOCUMENTS

| | | | |
|---|---|---|---|
| 6,560,038 B1 | 5/2003 | Parkyn, Jr. et al. | |
| 6,595,674 B1 | 7/2003 | Yoneda | |
| 6,692,431 B2 | 2/2004 | Kazakevich | |
| 6,816,241 B2 | 11/2004 | Grubisic | |
| 6,826,336 B2 | 11/2004 | Guy | |
| 6,876,408 B2 | 4/2005 | Yamaguchi | |
| 6,880,954 B2 | 4/2005 | Ollett et al. | |
| 6,902,310 B2 | 6/2005 | Im | |
| 6,921,920 B2 | 7/2005 | Kazakevich | |
| 7,029,277 B2 | 4/2006 | Gofman et al. | |
| 7,063,663 B2 | 6/2006 | Kazakevich | |
| 7,163,327 B2 | 1/2007 | Henson et al. | |
| 7,182,496 B2 | 2/2007 | Ruffin | |
| 7,182,497 B2 | 2/2007 | Lee et al. | |
| 7,250,611 B2 | 7/2007 | Aguirre et al. | |
| 7,300,177 B2 * | 11/2007 | Conner | 362/244 |
| 7,345,312 B2 * | 3/2008 | Kazakevich | 257/81 |
| 7,959,338 B2 * | 6/2011 | Kazakevich | 362/574 |
| 2001/0019378 A1 | 9/2001 | Yamaguchi | |
| 2002/0001140 A1 | 1/2002 | Heimer | |
| 2003/0112639 A1 | 6/2003 | Stack | |
| 2003/0231843 A1 | 12/2003 | Colombo et al. | |
| 2007/0053200 A1 | 3/2007 | Brukilacchio | |
| 2007/0086205 A1 | 4/2007 | Krupa et al. | |
| 2007/0275344 A1 | 11/2007 | Liu | |
| 2008/0310182 A1 | 12/2008 | Meinl | |

FOREIGN PATENT DOCUMENTS

| | | |
|---|---|---|
| WO | WO-2006/032160 A1 | 3/2006 |
| WO | 2006/045545 A1 | 5/2006 |

OTHER PUBLICATIONS

International Search Report and Written Opinion received for PCT Patent Application No. PCT/US2010/024141, mailed on Jun. 23, 2010, 12 pages.

* cited by examiner

LED ILLUMINATION DEVICE

CROSS REFERENCE TO RELATED APPLICATION

This application claims priority to U.S. Provisional Application No. 61/152,298, filed Feb. 13, 2009, the disclosure of which is herein incorporated by reference in its entirety for all purposes.

BACKGROUND

1. Field:

The present invention relates generally to light emitting diode (LED) based light sources, and more particularly to LED based light sources for fiber-optic applications.

2. Related Art

Fiber-optic light sources are generally well known and are used in a broad range of applications. In the medical field, fiber-optic illuminators are widely used in endoscopy, and comprise various light sources, fiber-optics, and endoscopes. Bulb-based medical fiber sources are currently widely available.

Light sources and fiber-optics are commonly used for microscopy illumination, with lamp-based products being generally available. Fiber-optic illumination systems are also used in industrial boroscopes and machine vision systems. While the preceding devices primarily provide "white" light for illumination, other fiber-optic light sources providing "blue" light in the wavelength range 420-490 nm are used in photodynamic therapy for pediatric hyperbilirubinemia.

Systems having light sources and fiber-optics for light transmission can also provide one or more defined wavelengths of light for fluorescent excitation in biological and other fields of research.

Many fiber-optic light sources share several common technological limitations. For example, fiber-optics can only accept incoming light rays which lie within an angle determined by the fiber optic materials. For most fiber-optic bundles composed of clad glass fibers, that acceptance half-angle is approximately 33°, corresponding to a numerical aperture (NA) of approximately 0.55. Therefore, for optimal efficiency the fiber-optic light source will usually have some type of focusing optics.

Commonly used fiber-optic bundles composed of clad glass fibers have a transmission factor on the order of 50%-70%. That is, only 50%-70% of the light impinging on the input face of the fiber bundle will exit the fiber optic as useable light. These losses are due to Fresnel losses at the input and output faces, the numerical aperture restriction, the fact that fiber bundles are typically composed of hundreds of small fibers with gaps between them, and attenuation losses along the fiber length. Therefore, fiber optic light sources must provide nearly two times the light that is desired at the fiber output.

For many applications, it is desirable that the light exiting the fiber bundle for illumination be uniform in color and intensity; however, a light source comprised of a bulb or of multiple LEDs may not provide uniform light, particularly in the far field. While fiber bundles can provide some degree of spatial light mixing due to randomization of fibers within the bundle, this is sometimes not sufficient and the fiber light source must use optics so as to produce uniform light from a non-uniform source.

Many currently marketed fiber optic light sources use halogen, metal halide, or xenon bulbs. While these bulbs-based systems can be a cost-effective means to produce white light of sufficient intensity, many have a short (e.g., less than a thousand hour) life; may include toxic materials that require special handling for manufacture and disposal; require high voltages to operate, thereby increasing the cost, size, and safety risk of the power supply; allow the color temperature to be varied only within a narrow range by varying the operating voltage, thereby altering the light intensity; have optional filters to provide different color temperatures, but at the expense of reduced output; generate light over a wide spectrum and thus require optical filters to narrow the wavelengths, which reduces light output and adds cost; and/or emit radiation in the infrared (IR) and ultraviolet (UV) wavelengths, which may have to be blocked with filters or other means, requiring additional optical components.

In response to the aforementioned issues, a number of devices have been manufactured or proposed which use light emitting diodes (LEDs) as light sources for fiber-optic illumination. In general, benefits of LED-based fiber-optic systems include longer (e.g., tens of thousands of hours) life; less and/or no toxic materials; low (e.g., less than 4 volts per LED) voltage; variable color temperature; specific wavelength specification; and very low UV or IR emission. Unfortunately, LED systems have their own unique technical challenges; in particular, limited light output. Most individual LEDs still produce significantly less light than most incandescent lamps. For example, the present maximum light output reasonably achievable from a single 1 mm white LED is approximately 200 lumens, whereas a 300 watt xenon lamp can produce over 2,000 lumens. Therefore, LED fiber sources have to use a plurality of LEDs to produce the desired output light intensity.

Additionally, for an optical system that includes lenses, there is a fundamental law of optics (Etendue) governing the image size and ray angle. For perfect lenses, the product of the image size and the ray angle is a constant (sometimes termed the Lagrangian invariant or optical system invariant). In reality, all lenses have aberrations which increase the value of this constant. In the case of coupling LED light into a fiber, the Etendue principle dictates that the product of the image size and the angle at the fiber face must be greater than the product of the LED source size and the emission angle.

In the context of the Etendue principle, there are additional constraints on the optical design. First, LEDs are fundamentally Lambertian sources which emit light in a hemispherical pattern, wherein the intensity varies as the cosine of the emission angle. Some LED packages include a lens which modifies this pattern. Therefore, the source angle is set by the choice of LED. Second, the size and shape of the LED source is set by the LED manufacturer. In the case of present high-brightness LEDs, the typical size and shape is 1 mm square. Therefore, the source size is set by the choice of LED. Third, the acceptance angle, or numerical aperture (NA), of the fiber optic is a function of fiber core and cladding material. The glass fibers most commonly used have a NA on the order of 0.5, and fiber materials are determined by the end-use application. Therefore, the illuminator design is constrained by the image angle. Fourth, the shape of fiber optics is almost universally circular. (Although other shapes, such as a square, can be achieved by fusing the glass fibers, this is uncommon in practice.) The size, or diameter, of the fiber optic is determined by the end-use application. Therefore, the illuminator design is also constrained by the image shape and size.

Further, a portion of the electrical energy consumed by LEDs generates heat rather than light. Compared to incandescent bulbs, LEDs must operate at much lower temperatures; typically, 120° C.-180° C. While bulbs dissipate heat by infrared emission, heat must be removed from LEDs by conduction from their non-emitting surface. These thermal factors typically impose constraints on the number of LEDs that can be placed closely together in an illumination device.

It is also known that in LED illuminators, light from multiple LEDs is generally needed to achieve the desired total light intensity, as contrasted to a single bulb in conventional illuminators. Individual LEDs, even those from the same manufacturing lot, will not have identical spectral or spatial intensity characteristics, and the LED characteristics are not typically under the optical designer's control. The challenge, then, with LED fiber illuminators is to combine light from multiple non-identical sources and create light which is uniform in color, spatial distribution, and angular distribution.

SUMMARY

In embodiments, the present methods and systems relate to an LED-based light source for fiber-optic applications. Presented in some embodiments is a design to increase light output within the constraints of the Etendue principle.

The present systems, methods, and designs include multiple light-emitting diodes (LEDs) mounted on a suitable substrate, a lens array to collect and collimate light from the LEDs, a lens to focus light onto the input end of a fiber-optic bundle, an optional light diffusing element, a device to support and align the LEDs and optical elements, and a device to remove heat from the LEDs.

In some embodiments, the optics are generally designed to increase the transfer of light energy from a number of LED sources to the input of a fiber bundle, although other applications will be evident. As will be shown, the optics can be designed to align and additively overlay the images of multiple LEDs onto an area of the fiber optic bundle input surface. In some embodiments, the optics are designed to match and/or account for the generally square shape of the LED die and the generally round shape of the fiber optic. The number of LEDs and corresponding lens tiles in the lens array can be chosen to provide an advantageous balance between light collection efficiency and heat generation. The geometrical arrangement of LEDs and lens tiles can be chosen to reduce the space required. The lens array can be designed to increase the optical light capture area and reduce optically ineffective areas between lens tiles. The present methods, systems, and designs include a design that, in some embodiments, does not require either the LEDs or the lenses to be arranged at an angle from the central axis, thereby simplifying manufacturing. In some embodiments, an optional diffusing element may be placed at an optimal location in the optical path to further improve the color and intensity uniformity of the light.

Some embodiments disclose a plurality of LEDs mounted co-planar so as to have parallel emission direction, the number of LEDs being in the range of approximately 5 to approximately 25; and, a plurality of lens tiles that are co-planar, having parallel optical axes. The lens tiles can be at the same distance from the plurality of LEDs. The central axis of each lens can be aligned with the central axis of the corresponding LED. The number of lens tiles can be in the range of approximately 5 to approximately 25. In some embodiments, each lens tile can be and/or include an aspheric planar-convex design, with each lens having the substantially same lens parameters.

The lens tiles can be arranged in a "flower-tiling" array in which there are substantially no interior gaps between adjacent lens tiles and in which the outermost perimeters of the lens tiles remain circular and are not truncated. Tiling arrangement of LEDs and lens tiles can include a geometrical center axis which is coincident with the central optical axis of the focusing lens. The arrangement of LEDs and lens tiles can result in collimated light exiting the lens array.

Also disclosed is a focusing lens proximal to the lens array which gathers the collimated light and focuses the light. The focusing lens can be of an aspheric planar-convex design. The focusing lens outer diameter can be matched to the effective outer diameter of the lens array.

In some embodiments, the present optical design results in a projected image which overlays the LED sources into a single image. The intensity of light in the single image can be greater than the intensity of light projected from any single LED.

Other objects and advantages will become apparent hereinafter in view of the specification and drawings.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Figure 1:
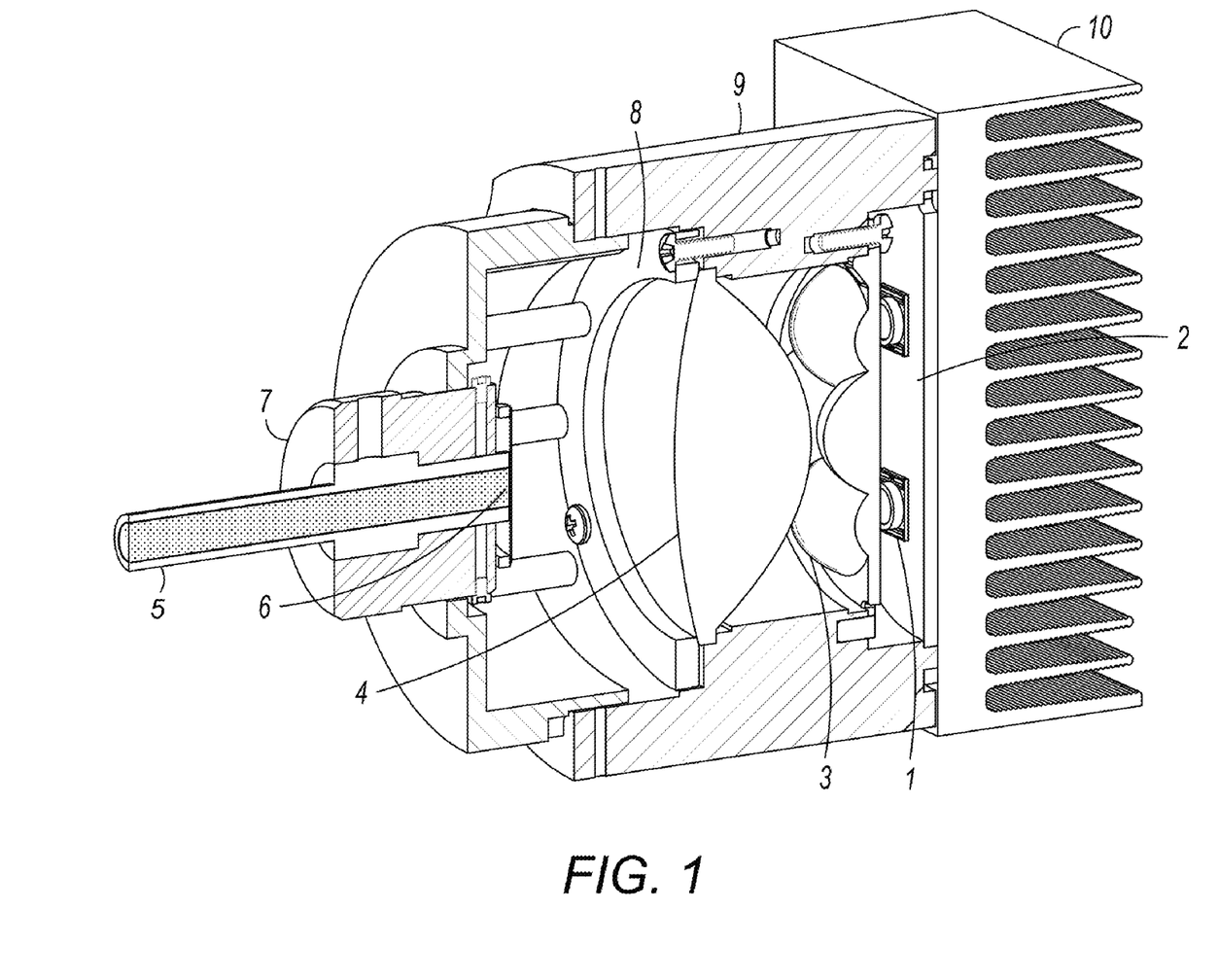
FIG. 1 illustrates a cross-sectional view of an exemplary optical system in accordance with the present application.
Figure 2:
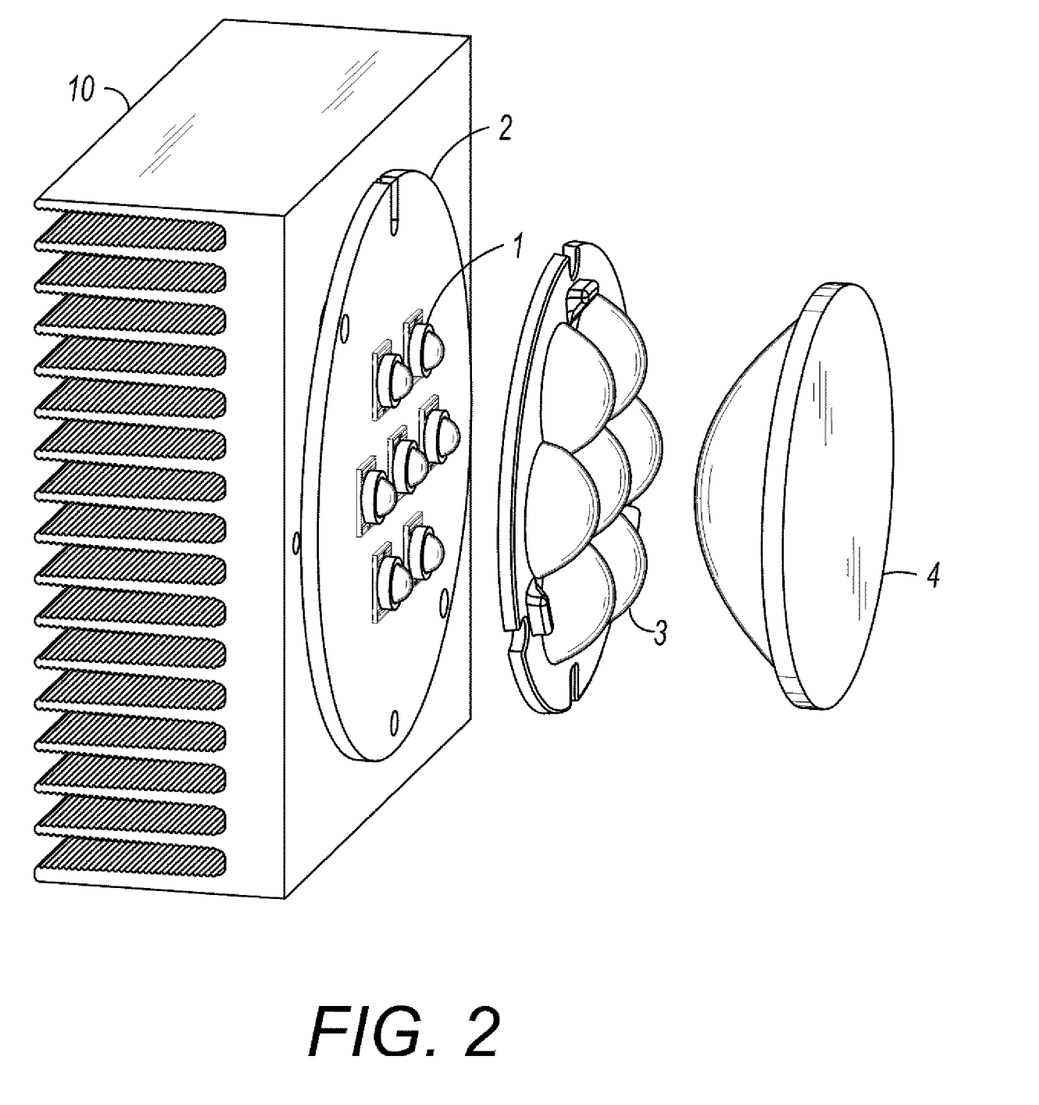
FIG. 2 illustrates a perspective view of some elements of the exemplary optical system shown in FIG. 1.

FIGS. 1 and 2 illustrate a cross sectional view and a perspective view, respectively, of an exemplary optical system in accordance with the present application. With reference to FIGS. 1 and 2, one or more light emitting diodes (LEDs) 1 are mounted on an otherwise conventional circuit board 2 which provides electrical power to the LEDs 1 and aids in heat removal from the LEDs 1. The disclosed lens array 3 gathers and collimates light from the LEDs 1. A sufficiently sized/large lens 4 gathers and focuses the light onto the input 6 of a fiber-optic bundle 5.

The optic support housing 9 serves to hold the LEDs 1, lens array 3, large lens 4, and fiber optic holder 7 in relatively precise alignment. A lens clamp ring 8 holds the large lens 4 in the optic support housing 9. A fiber optic holder 7 holds the fiber optic bundle 5 in relatively precise alignment with the optical system.

The LED circuit board 2 can be a metal-core circuit board having an aluminum substrate and a thin dielectric layer for LED mounting and heat removal. Heat from the LEDs 1 is transferred by conduction through the circuit board 2 to the heat sink 10. The heat sink 10, optionally in conjunction with a fan (not shown), serves to remove heat from the LEDs 1 to the ambient air by convection.

Figure 3A:
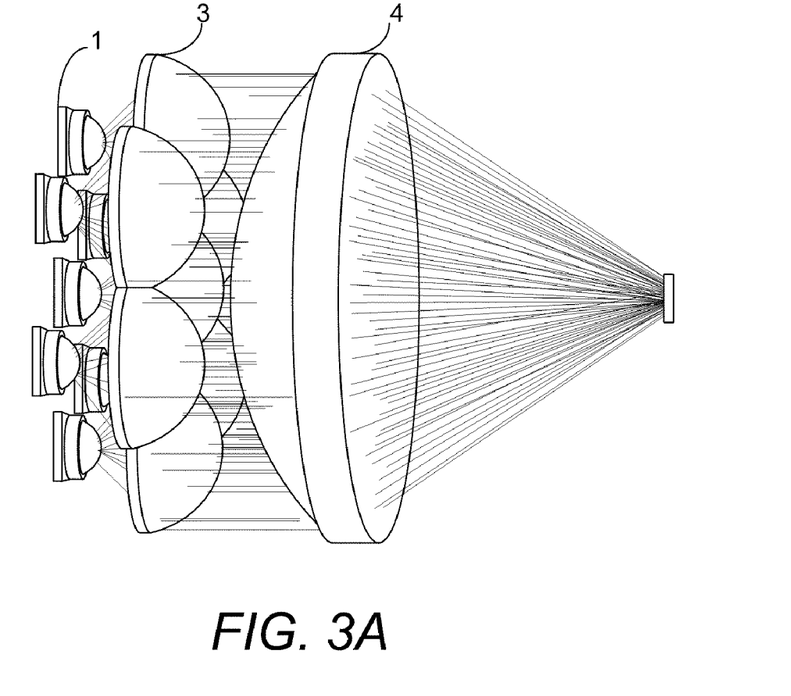
FIGS. 3A and 3B illustrate a large focusing lens converging the light from all LEDs into a final image.
Figure 3B:
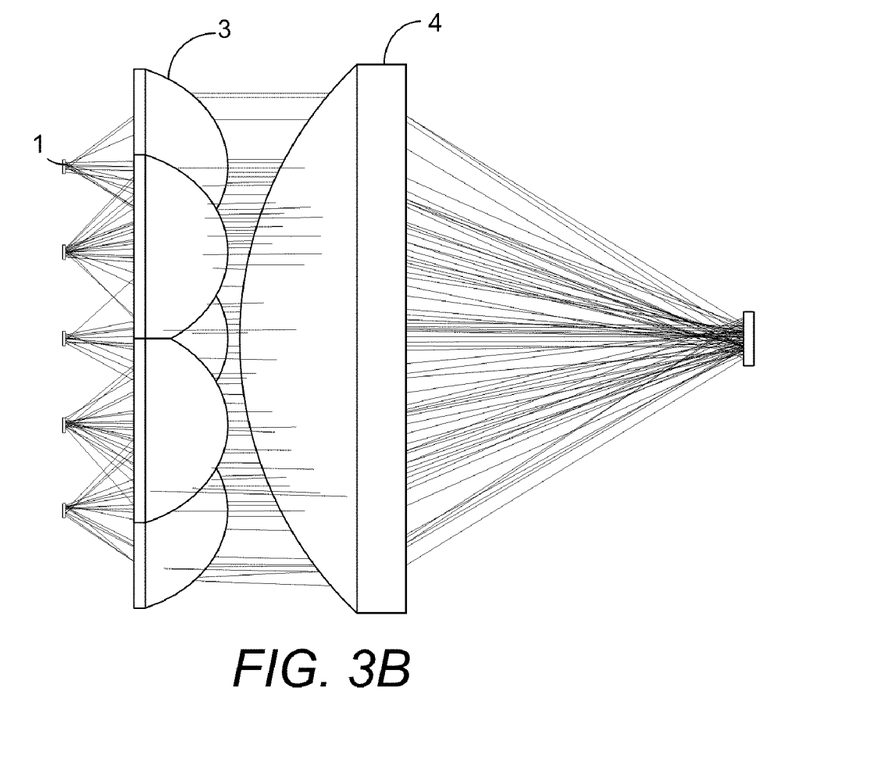

The LEDs 1 are arranged in a radially symmetric array, with the center of each LED 1 aligned with the central axis of each corresponding lens tile within the lens array 3. Accordingly, there is a one-to-one correspondence between an LED 1 and a lens tile. The LEDs 1 are mounted coplanar and the center axis of each LED 1 is approximately parallel. The distance from each LED 1 to each lens tile is designed to be substantially equal. Since each LED 1 is of the same type and configuration from the same manufacturer, each LED 1 will have a substantially similar emission beam pattern (source shape), within manufacturing tolerances. Each lens tile within the lens array 3 is designed to have an identical optical profile, within manufacturing variation. As will be described in greater detail below, the lens tiles can be tessellated in a "flower-tiling" geometry to form the lens array 3. As shown in FIGS. 3A and 3B, the large focusing lens 4 converges the light from all LEDs 1 into a final image which is an overlay of all the LED images. At the focal point, the LED images have the same size and align on a common optical axis.

The magnification of the system is defined as the ratio of the image size to the LED emitting surface size. System magnification is determined by the focal length of the lens tiles and the focal length of the large focusing lens. By varying these two parameters, the magnification can be adjusted so that the resulting image size matches the entrance aperture of the fiber optic. In an exemplary embodiment, the magnification is calculated to be 3.3, and the actual realized magnification is slightly greater.

Figure 4:
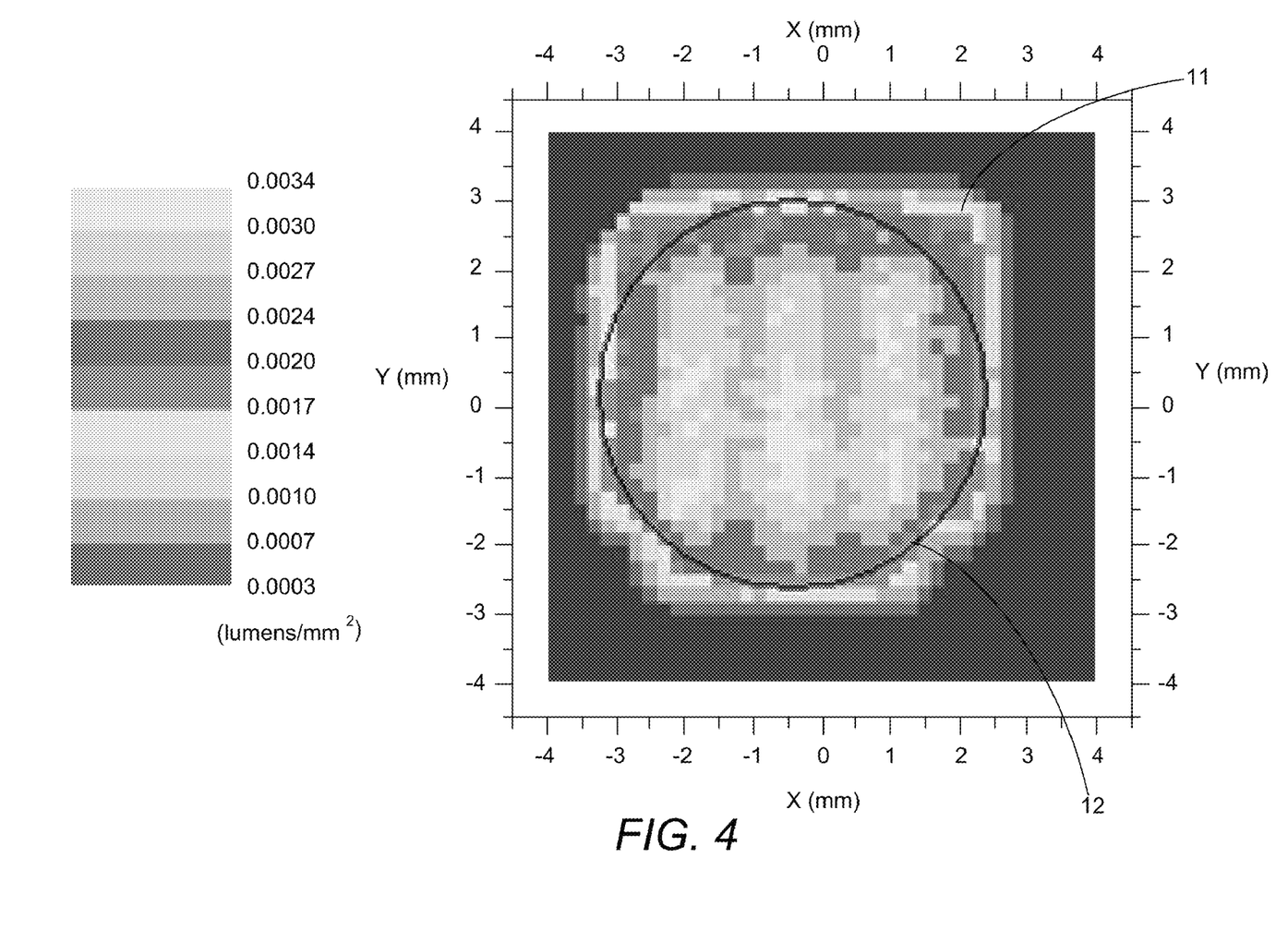
FIG. 4 illustrates a square-shaped illuminance distribution at the fiber input face.

The source image of an LED will correspond to the generally square-shaped LED die. In some exemplary embodiments, the resulting illuminance image shape is a square. A calculated illuminance plot of this square-shaped illuminance image generated by optical simulation is shown in FIG. 4. In some exemplary embodiments, the magnification may be set such that the illuminance image 11 substantially matches the circular acceptance area 12 of the fiber optic bundle.

Lens aberrations increase the Lagrangian invariant of the optical system and therefore reduce system efficiency. In some exemplary embodiments, lens parameters are adjusted to reduce aberrations and increase system efficiency. Specifically, aspheric planar-convex lens tiles may be used for the collimating lens array. Two spherical lenses combined are sometimes used to reduce spherical aberrations, but this approach adds system complexity and cost. The disclosed single aspheric lens tile can reduce spherical aberrations, reduce light loss from Fresnel surface losses, and reduce part count, weight, and cost.

In general, an aspheric lens may be planar-concave, planar-convex, bi-convex, or bi-concave. When the source is at the lens focal point and the image is at infinity (i.e., collimated light), a concave or convex lens with a nearly-planar front surface will result in the minimum spherical aberration. In some exemplary embodiments, the LED source is placed at the lens focal point, and a planar-convex aspheric lens may be used for the collimating lens tile.

In one exemplary embodiment, plastic may be utilized rather than glass for economical molding of the lens array. Although precision molding of a single aspheric glass lens has existed for years, precision molding of an aspheric glass lens array is uncommon and costly. Plastic injection molding offers an accuracy comparable to glass grinding and polishing techniques at relatively low cost. In some exemplary embodiments, the optic axis of each LED is aligned with the optic axis of each corresponding lens tile. Relatively precise positioning of the lens array may be achieved with mounting and alignment features molded into the lens array.

Figure 5:
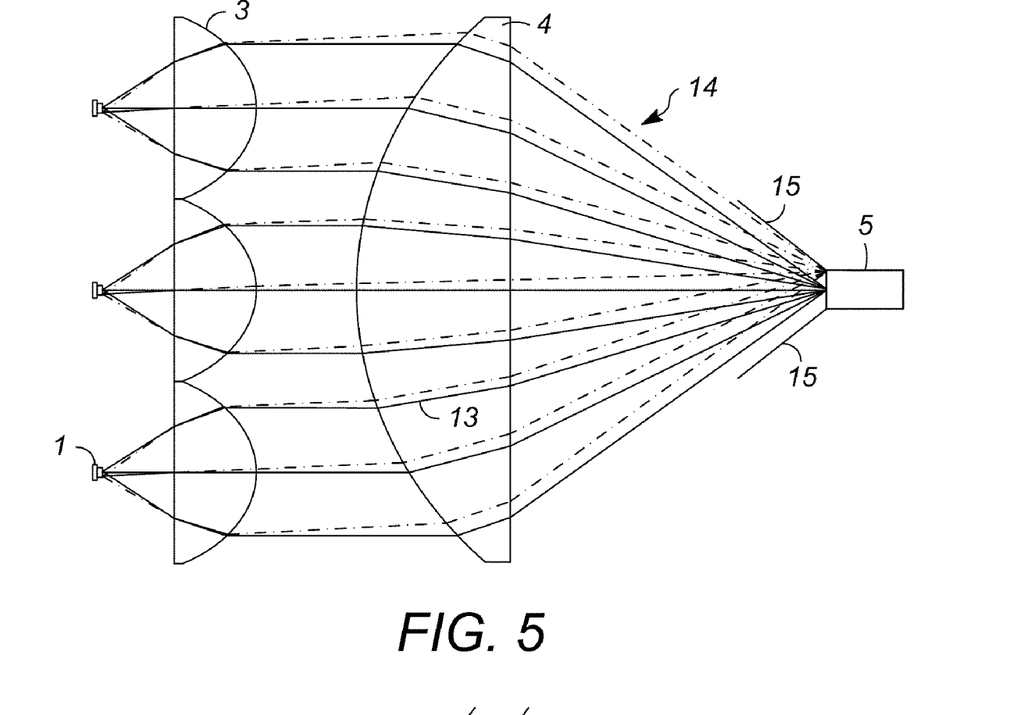
FIG. 5 illustrates a two-dimensional optical ray-trace of an exemplary embodiment, demonstrating that light from multiple LEDs merges into one overlapped image.
Figure 6:
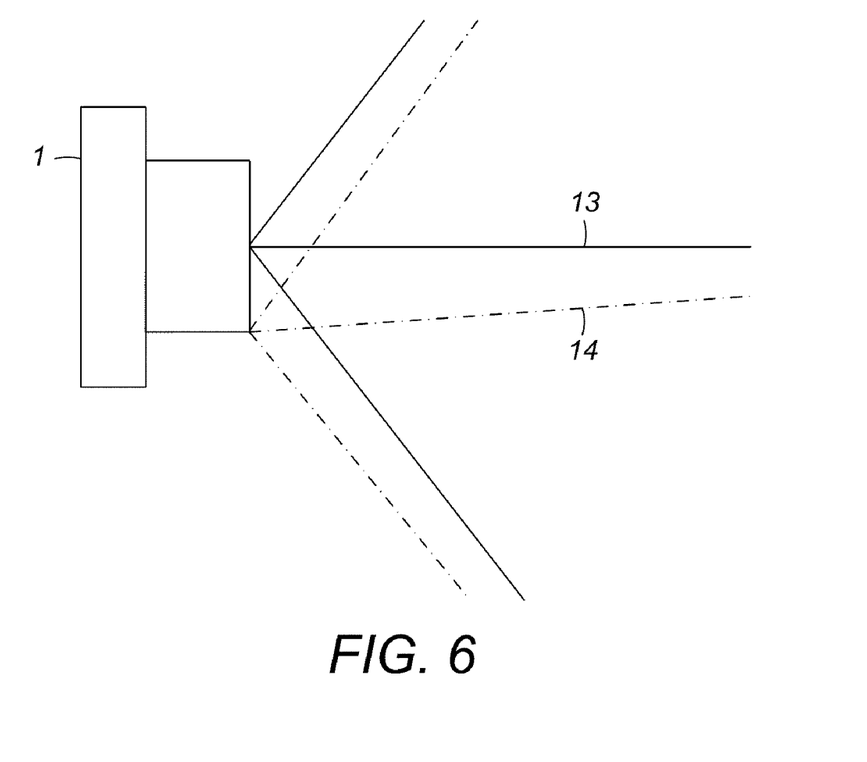
FIG. 6 illustrates a zoomed-in view of FIG. 5.

A two-dimensional optical ray-trace of an embodiment is shown in FIG. 5, demonstrating that light from multiple LEDs 1 merges into one overlapped image, thus providing increased light output. This overlapping image also reduces color separation if different LED colors are used, such as red-green-blue-amber (RGBA) combinations, to achieve white light. Because the optic design is radially symmetrical, a two-dimensional plot is sufficiently illustrative. The on-axis rays 13 (indicated by solid rays) start from the center of each LED 1 and end at or near the central axis of fiber optic 5. The off-axis rays 14 (indicated by non-solid rays) start from the edge of each LED 1 and end at or near the fiber perimeter. Not all rays are shown; so-called stray rays which do not fall within the fiber acceptance angle 15 are not shown. The focusing angle of the large lens 4 may be chosen to be approximately equal to the acceptance angle 15 of the fiber optic 5. FIG. 6 is a zoomed-in view of FIG. 5, showing on-axis rays 13 and off-axis rays 14 emitted from LED 1.

Figure 7:
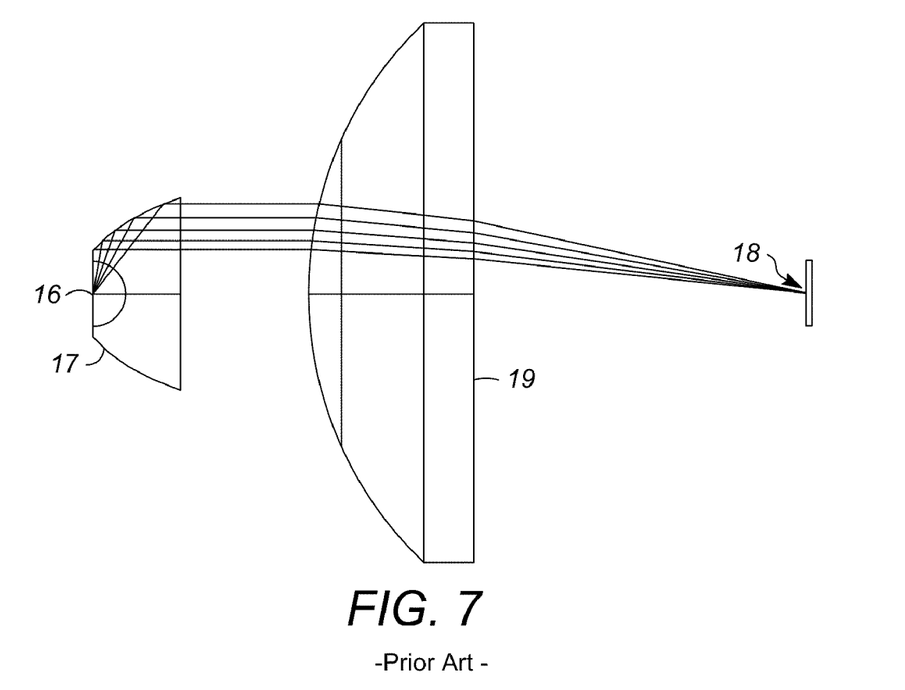
FIG. 7 illustrates a two-dimensional optical ray-trace of a prior art system in which TIR (total internal reflection) lenses are used to collimate light from the LEDs. The light source is an on-axis point.
Figure 8:
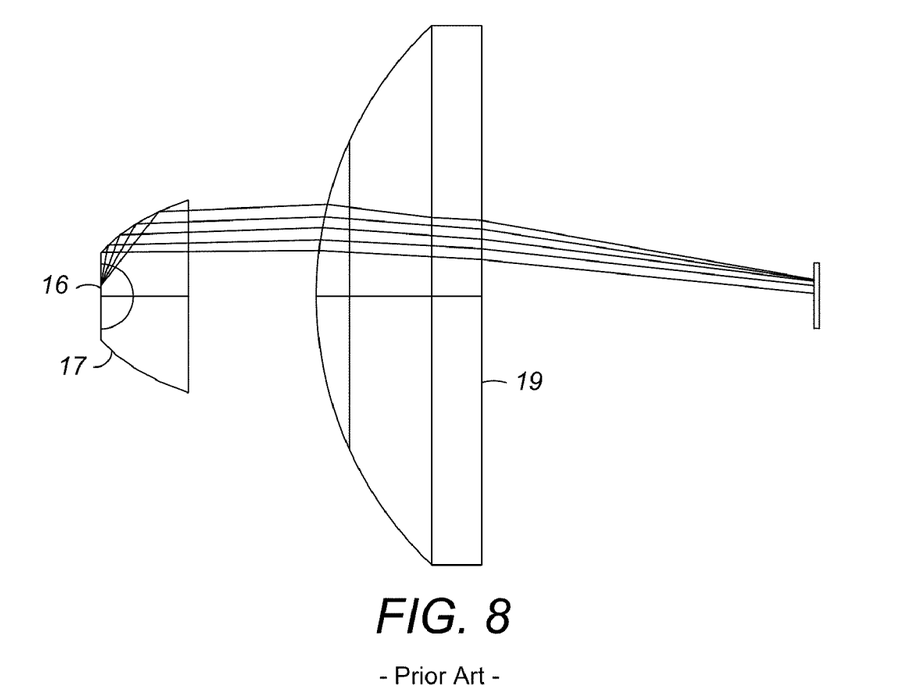
FIG. 8 illustrates a two-dimensional optical ray-trace of a prior art system in which TIR (total internal reflection) lenses are used to collimate light from the LEDs. The light source is off axis.

Some optical systems use TIR (total internal reflection) lenses to collimate light from the LEDs. Such TIR lenses 17 are generally paraboloid with a light source 16 at the lens focal point. When the source is an on-axis point, light from the TIR lens will be well collimated and can be focused to a point 18 with an aspheric focusing lens 19, as shown in FIG. 7. However, when the source is off axis, as shown in FIG. 8, light from the TIR lens is not collimated and cannot be focused into a point. Since LEDs are extended sources, most light will be emitted off-axis and TIR lens systems cannot image an LED source without significant aberration. Optical systems in accordance with the present application use refractive lenses to image the LED source with reduced aberrations, thus enhancing system performance.

Figure 9:
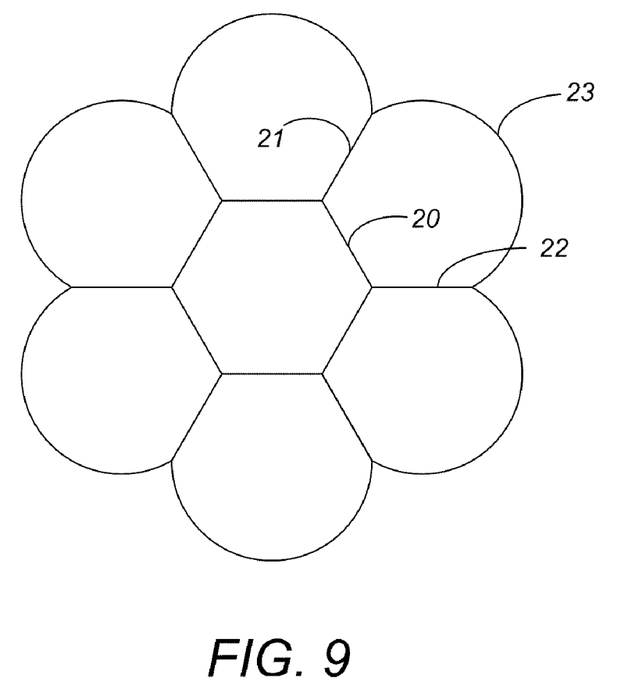
FIG. 9 illustrates a one-piece collimating lens array comprising a plurality of lens tiles in an exemplary flower-tiling configuration.
Figure 10:
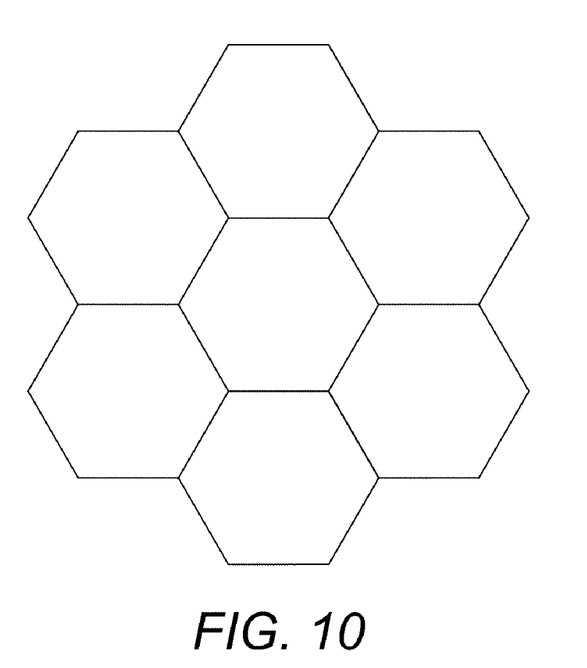
FIG. 10 illustrates a hexagonal tiling.

In some exemplary embodiments, a one-piece collimating lens array comprising a plurality of lens tiles is utilized. As shown in FIG. 9, the configuration is termed "flower-tiling" to distinguish it from the hexagonal or circular tiling. Compared with a hexagonal tiling of lens, depicted in FIG. 10, the exemplary flower-tiling configuration shown in FIG. 11 has a greater area at the periphery of the array to capture light. Further, the flower-tiling configuration has a greater optical area at the interior of the array than a circular array, as shown in FIG. 12, of similar size. Although the modified hexagonal flower tiling arrangement is preferred for maximum intensity, it should be understood that the subject invention is intended to cover systems which include more conventional circular lenses of FIG. 12 or hexagonal lenses of FIG. 10.

One exemplary flower-tiling configuration is shown in FIG. 9. The flower-tiling configuration has a hexagon tile in the center. There are six identical non-overlapping tiles surrounding and immediately adjacent to the hexagon tile in the center. Each of the six identical tiles has a first edge 20 directly abutting a corresponding edge of the hexagon tile in the center. The first edge 20 is in parallel with the corresponding edge of the hexagon tile in the center. The first edge 20 has an exact length as the corresponding edge. Each of the six identical tiles has a second edge 21 extending from a first end of the first edge 20, wherein the first edge 20 and the second edge 21 have an angle of 120° between them. Similarly, each of the six identical tiles has a third edge 22 extending from a second end of the first edge 20, wherein the first edge 20 and the third edge 22 have an angle of 120° between them. In addition, each of the six identical tiles has an arc 23 connecting the ends of the second edge 21 and the third edge 22.

Figure 11:
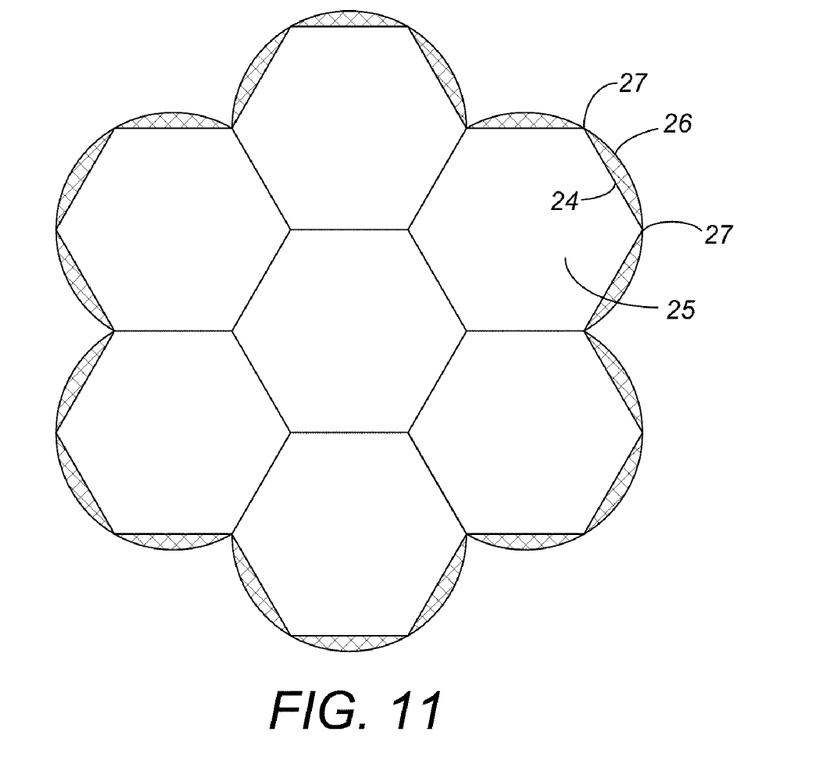
FIG. 11 illustrates that the exemplary flower-tiling configuration in FIG. 9 has a greater area at the periphery of the array than the hexagonal tiling configuration.
Figure 12:
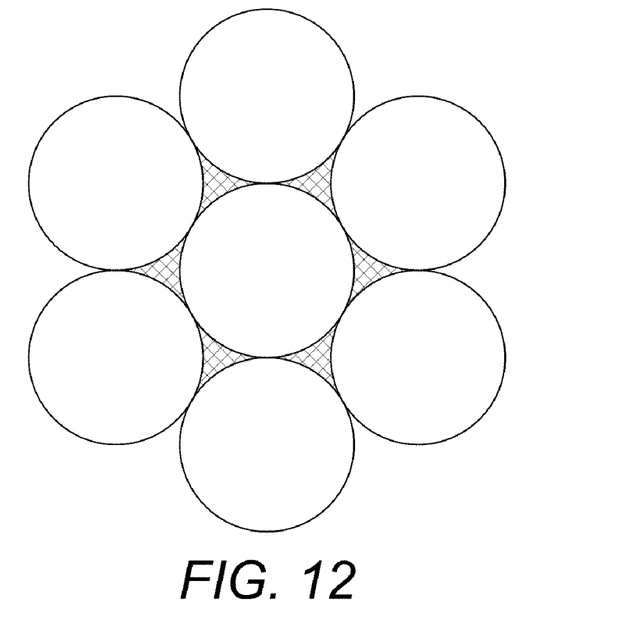
FIG. 12 illustrates a circular tiling.

With reference to FIG. 11, the exemplary flower-tiling configuration is a modified hexagonal tiling. The modification of the hexagonal tiling comprises replacing an exterior edge 24 of an exterior hexagon 25 on the hexagonal tiling by an arc 26 connecting the two vertices 27 of the exterior edge 24 of the exterior hexagon 25. Hexagon 25 is an exterior hexagon on the hexagonal tiling because hexagon 25 has at least one exterior edge 24 not positioned parallel to and adjacent to an edge of another hexagon on the hexagonal tiling. Note that in the flower-tiling configuration shown in FIG. 11, three exterior edges of each exterior hexagon on the hexagonal tiling are replaced by three corresponding arcs.

Figure 13:
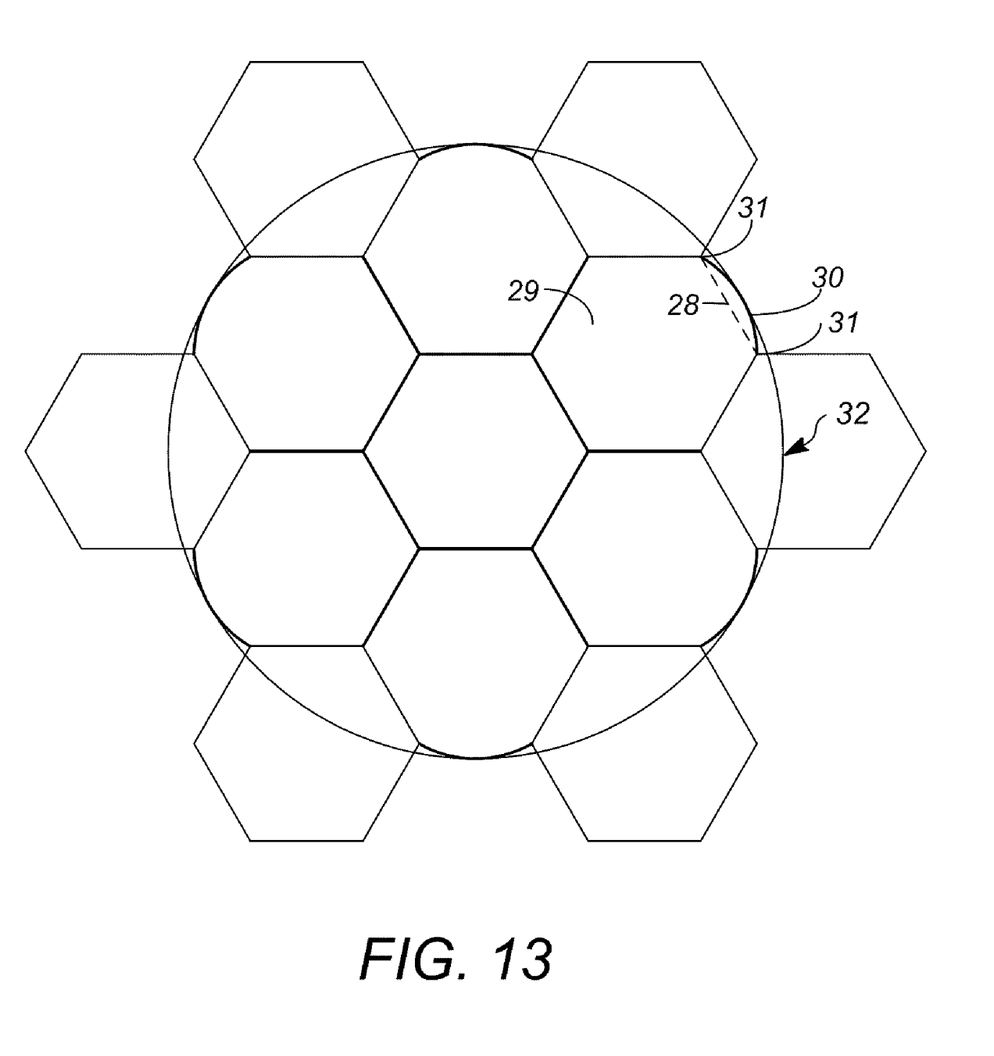
FIG. 13 illustrates a flower-tiling lens array with 13 LEDs.

Higher output may be achieved by adding more LEDs than the 7 used in the illustrated embodiments. For example, FIG. 13 shows a flower-tiling lens array with 13 LEDs. The flower-tiling configuration is a modified hexagonal tiling. The modification of the hexagonal tiling comprises replacing an exterior edge 28 of an exterior hexagon 29 on the hexagonal tiling by an arc 30 connecting the two vertices 31 of the exterior edge 28 of the exterior hexagon 29. Hexagon 29 is an exterior hexagon on the hexagonal tiling because hexagon 29 has at least one exterior edge 28 not positioned parallel to and adjacent to an edge of another hexagon on the hexagonal tiling.

As shown in FIG. 13, the circular line 32 illustrates the approximate outer diameter for light capture set by the fiber NA and the focal length of the focusing lens. Thus, only a portion of the light emitted from the additional outer six LEDs will enter the fiber, even if the large lens is increased in diameter, because much of their light will fall outside the fiber acceptance angle. In this example, achieving a calculated flux gain of 17% requires a 46% increase in the number of LEDs, increasing the thermal load, cost, size, and electrical power requirements by a similar ratio. In an exemplary embodiment, 7 LEDs are utilized to balance between the tradeoff between light output versus heat, power, size, and cost. Those of ordinary skill in the art will recognized that other quantities of LEDs are possible.

Figure 14:
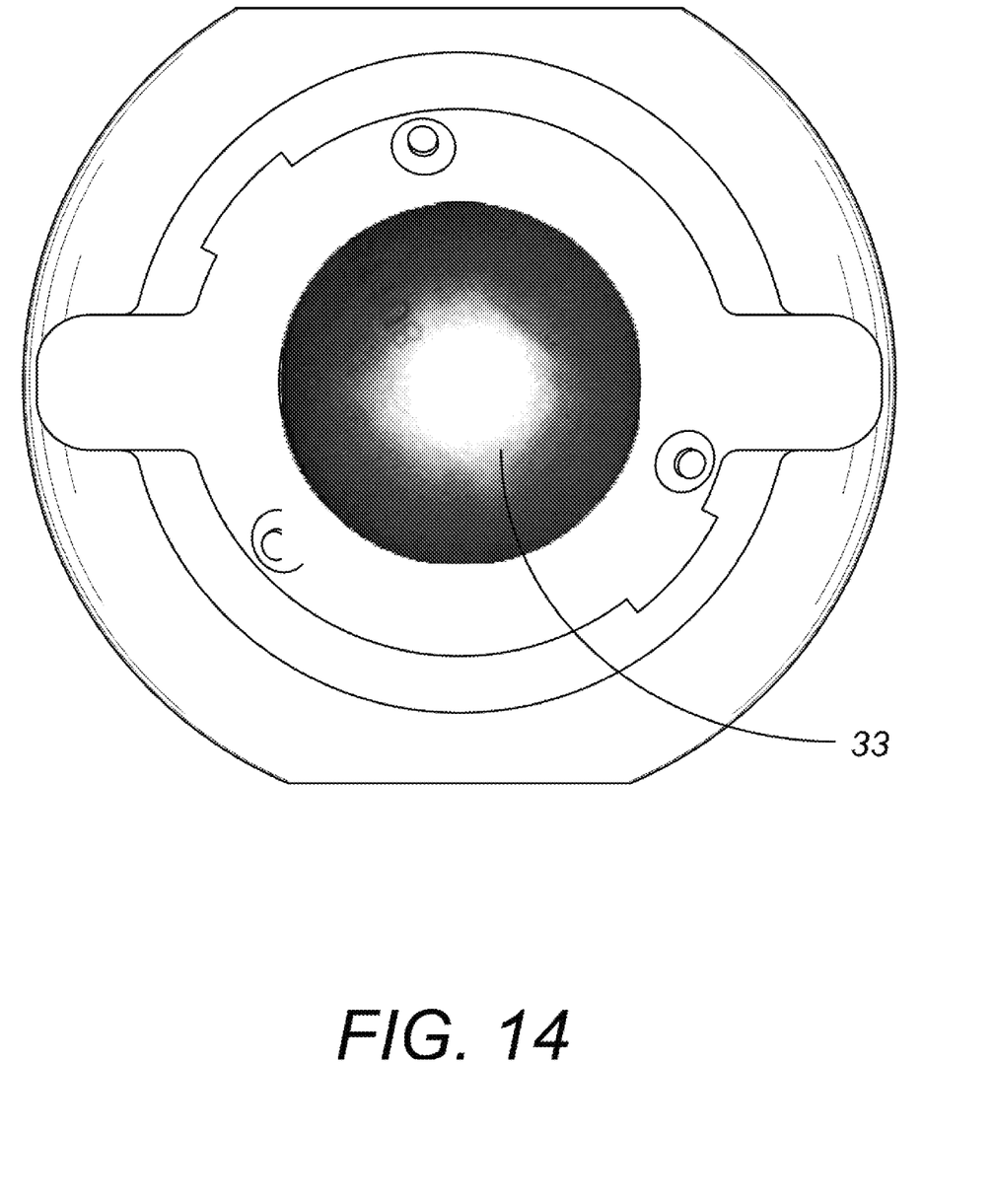
FIG. 14 illustrates a plurality of LEDs imaging onto a diffuser film approximately at the focal plane of a fiber input.

In some applications, uniform illumination is desired. Due to variations in LED output, imaging of the LED die, slight variations in the optics, and so on, the resulting image may not have desired uniformity. In one exemplary embodiment, an optical diffusing element such as holographic diffuser film may be placed at the image plane to homogenize the light distribution. For example, as shown in FIG. 14, LEDs are imaged onto a diffuser film approximately at the fiber input. Note that the LED images are overlapped into one nearly contiguous image 33. Alternatively, if space allows, a mixing solid rod of light transmitting material with one end placed at the image plane and the other end adjacent to the fiber-optic entrance aperture may be used to homogenize the light distribution.

Some exemplary embodiments have achieved approximately 415 lm (lumens) output from the exit aperture of a conventional glass 5 mm fiber optic bundle with NA=0.5 and 2 m length. This output compares very favorably with a calculated output of 457 lm under the same conditions. The calculated and measured outputs also compare favorably with the result predicted by Etendue limits.

As expected, the light output varies for fibers with the same NA but different diameters as follows: 180 lm from 3.2 mm fiber; 415 lm from 5 mm fiber; and 644 lm from 8 mm fiber.

It should be recognized that other variations may be made to various embodiments of the present application. For example, the collimating lens array may comprise Fresnel lenses arrayed in the inventive "flower-tiling" pattern. The collimating lenses may be a planar convex lens as shown, and may also be planar concave, meniscus convex, meniscus concave, bi-convex, or bi-concave. The large focusing lens may be a spherical lens, aspherical lens, or Fresnel lens. The number of LEDs and tiled lenses is not limited to seven, and may range from 1 to any number, but practical implementations will generally include numbers of LEDs and lenses from approximately 5 to approximately 25.

It should be recognized that embodiments of the present application are not limited to single color LEDs. An array of LEDs of different colors can be used if their emitting surfaces are of approximately the same size. The final image will be an overlay image of different colors. For example, an overlay of red, green and blue may be used to produce white light.

It should be recognized that the embodiments of the present application are not limited to coupling light into fiber. The resulting image may be used as a focused high intensity spot light, task light, or examination light.

The light source is not limited to light emitting diodes (LEDs). Alternatively, organic light emitting diode (OLED) or other suitable light sources may be used.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the present disclosure is not to be limited to the embodiments disclosed herein, can include practices otherwise than specifically described, and is to be interpreted as broadly as allowed under the law.

What is claimed is:

1. An illumination device comprising:
   a plurality of light emitting diodes arranged in a coplanar array, wherein the coplanar array comprises a light emitting diode at the center and light emitting diodes positioned radially symmetrically around the light emitting diode at the center, and wherein the central axes of the plurality of light emitting diodes are arranged to be parallel to each other;
   a one-piece lens array collimating light from the plurality of light emitting diodes, the lens array comprising a plurality of coplanar lens tiles, wherein the coplanar lens tiles comprise a lens tile at the center and lens tiles positioned radially symmetrically around the lens tile at the center, and wherein the central axis of each of the lens tiles is aligned with the central axis of a corresponding light emitting diode; and
   a focusing lens converging the collimated light from the lens array into a single image in a focal plane, wherein the central axis of the focusing lens is aligned with the central axis of the lens array.

2. The illumination device of claim 1, wherein the lens tiles are hexagonal in shape.

3. The illumination device of claim 1, wherein the lens tiles are circular in shape.

4. The illumination device of claim 1, wherein the coplanar lens tiles are arranged in a modified hexagonal tiling, wherein the modification of the hexagonal tiling comprises replacing an exterior edge of an exterior hexagon on the hexagonal tiling by an arc connecting the two vertices of the exterior edge of the exterior hexagon.

5. An illumination device comprising:
   a plurality of light emitting diodes arranged in a coplanar array, wherein the coplanar array comprises a light emitting diode at the center and light emitting diodes positioned radially symmetrically around the light emitting diode at the center, and wherein the central axes of the plurality of light emitting diodes are arranged to be parallel to each other;
   a one-piece lens array collimating light from the plurality of light emitting diodes, the lens array comprising a plurality of coplanar lens tiles, wherein the coplanar lens tiles comprise a lens tile at the center and lens tiles positioned radially symmetrically around the lens tile at the center, and wherein the central axis of each of the lens tiles is aligned with the central axis of a corresponding light emitting diode;
   a focusing lens converging the collimated light from the lens array into a single image in a focal plane, wherein the central axis of the focusing lens is aligned with the central axis of the lens array; and
   an optical fiber having an input surface with the input surface being positioned in the focal plane for receiving the focused light from the diodes.

6. The illumination device of claim 5, wherein the lens tiles are hexagonal in shape.

7. The illumination device of claim 5, wherein the lens tiles are circular in shape.

8. The illumination device of claim 5, wherein the coplanar lens tiles are arranged in a modified hexagonal tiling, wherein the modification of the hexagonal tiling comprises replacing an exterior edge of an exterior hexagon on the hexagonal tiling by an arc connecting the two vertices of the exterior edge of the exterior hexagon.

9. An illumination device comprising:
   a plurality of light emitting diodes;
   a lens array collimating light from the plurality of light emitting diodes, the lens array comprising a plurality of coplanar lens tiles arranged in a modified hexagonal tiling, wherein the modification of the hexagonal tiling comprises replacing an exterior edge of an exterior hexagon on the hexagonal tiling by an arc connecting the two vertices of the exterior edge of the exterior hexagon; and
   a focusing lens converging the collimated light from the lens array into a single image.

10. The illumination device of claim 9, wherein the exterior hexagon is a hexagon on the hexagonal tiling having at least one exterior edge, wherein the at least one exterior edge is not positioned parallel to and adjacent to an edge of another hexagon on the hexagonal tiling.

11. The illumination device of claim 9, wherein the hexagonal tiling comprises:
    a hexagon in the center; and
    six exterior hexagons surrounding and adjacent to the hexagon in the center.

12. The illumination device of claim 11, wherein three exterior edges of each of the six exterior hexagons are replaced by a corresponding arc.

13. The illumination device of claim 9, wherein the lens array is a one-piece lens array.

14. The illumination device of claim 13, wherein the one-piece lens array is formed by plastic injection molding.

15. The illumination device of claim 9, wherein the lens tiles are aspheric.

16. The illumination device of claim 9, wherein the lens tiles are selected from the group consisting of Fresnel lenses, planar convex lenses, planar concave lenses, meniscus convex lenses, meniscus concave lenses, bi-convex lenses, and bi-concave lenses.

17. The illumination device of claim 9, wherein the plurality of light emitting diodes are arranged in a coplanar array.

18. The illumination device of claim 9, wherein the plurality of light emitting diodes are arranged in a radially symmetric array.

19. The illumination device of claim 9, wherein the central axes of the plurality of light emitting diodes are arranged to be parallel to each other.

20. The illumination device of claim 9, wherein each of the light emitting diodes has one corresponding lens tile, and wherein the central axis of each of the light emitting diodes is aligned with the central axis of the corresponding lens tile.

21. The illumination device of claim 9, wherein the central axis of the lens array is aligned with the central optical axis of the focusing lens.

22. The illumination device of claim 9, wherein the focusing lens is an aspheric planar convex lens.

23. The illumination device of claim 9, wherein the single image is at the focal point of the focusing lens.

24. The illumination device of claim 9, wherein the single image is an overlay of the images corresponding to the plurality of light emitting diodes.

25. The illumination device of claim 24, the images corresponding to the plurality of light emitting diodes each having an identical size and each aligned on a common optical axis.

26. The illumination device of claim 9, wherein the single image is projected onto an input of a fiber optic bundle.

27. The illumination device of claim 26, the size of the single image matching the entrance aperture of the fiber optic bundle.

28. An illumination device comprising:
a plurality of light emitting diodes;
a lens array collimating light from the plurality of light emitting diodes, the lens array comprising a plurality of coplanar lens tiles, the plurality of coplanar lens tiles comprising:
   a hexagon tile in the center; and
   six identical non-overlapping tiles surrounding and immediately adjacent to the hexagon tile in the center, wherein each of the six identical tiles has a first edge directly abutting a corresponding edge of the hexagon tile in the center, the first edge in parallel with and having exact length as the corresponding edge, and wherein each of the six identical tiles has a second edge extending outwardly from a first end of the first adge,the first and the second edges having an angle of one hundred and twenty degrees between, and wherein each of the six identical tiles has a third edge extending from a second end of the first edge, the first and the third edges having an angle of one hundred and twenty degrees between, and wherein each of the six identical tiles has an arc connecting the ends of the second edge and the third edge; and
a focusing lens converging the collimated light from the lens array into a single image.

29. An illumination device comprising:
seven light emitting diodes arranged in a coplanar array;
a lens array collimating light from the plurality of light emitting diodes, the lens array comprising a plurality of coplanar lens tiles, the plurality of coplanar lens tiles comprising:
   a hexagon tile in the center; and
   six identical non-overlapping tiles surrounding and immediately adjacent to the hexagon tile in the center, wherein each of the six identical tiles has a first edge directly abutting a corresponding edge of the hexagon tile in the center, the first edge in parallel with and having exact length as the corresponding edge, and wherein each of the six identical tiles has a second edge extending outwardly from a first end of the first edge, the first and the second edges having an angle of one hundred and twenty degrees between, and wherein each of the six identical tiles has a third edge extending from a second end of the first edge, the first and the third edges having an angle of one hundred and twenty degrees between, and wherein each of the six identical tiles has an arc connecting the ends of the second edge and the third edge; and
a focusing lens converging the collimated light from the lens array into a single image.

* * * * *